United States Patent [19]

Okuzawa et al.

[11] Patent Number: 4,923,034

[45] Date of Patent: May 8, 1990

[54] VIBRATION-CONTROLLING MEMBER

[75] Inventors: Masayuki Okuzawa; Yuzo Okudaira; Futoshi Maeda, all of Kadoma, Japan

[73] Assignee: Matsushita Electric Works, Ltd., Japan

[21] Appl. No.: 244,510

[22] Filed: Sep. 15, 1988

[30] Foreign Application Priority Data

Nov. 26, 1987 [JP] Japan ................................ 62-298614
May 26, 1988 [JP] Japan ................................ 63-128757

[51] Int. Cl.[5] .......................... F16F 15/00; F04B 1/82

[52] U.S. Cl. .................................. 181/207; 181/208; 181/290; 181/294; 428/447

[58] Field of Search ................................ 181/207-209, 181/290, 294; 428/48, 161, 215, 447

[56] References Cited

U.S. PATENT DOCUMENTS 3,117,054 1/1964 Antonucci ..................... 181/208 X
4,255,482 3/1981 Udagawa ........................... 428/215
4,415,616 11/1983 Angloletti ............................ 428/48
4,800,127 1/1989 Saad et al. ........................... 428/447
4,803,112 2/1989 Kakimoto et al. .................. 428/161

FOREIGN PATENT DOCUMENTS 48-4947 2/1973 Japan .
49-2867 1/1974 Japan .
56-159158 12/1981 Japan .
57-70129 4/1982 Japan .

*Primary Examiner*—Benjamin R. Fuller
*Attorney, Agent, or Firm*—Leydig, Voit & Mayer

[57] ABSTRACT

A vibration-controlling member is made by containing a flake-shaped powdery substance having vibration controlling action in a retainer adhered to one surface of a surface sheet. Any external shock imparted to the member is subjected to the vibration controlling action due to a grain boundary friction of the powdery substance.

4 Claims, 8 Drawing Sheets

VIBRATION-CONTROLLING MEMBER

TECHNICAL BACKGROUND OF THE INVENTION

This invention relates to a vibration-controlling member and, more particularly, to a member employable as such a construction material as a floor board having a surface sheet backed with a shock absorbing and vibration damping means, to be the vibration-controlling member achieving a sound-proof, or shock-absorbing function.

The vibration-controlling member of the kind referred to will be effectively utilizable as the floor board and the like for use in multistoried apartment houses, condominiums and the like buildings where no carpet is to be laid on the floor.

1. Disclosure of Prior Art

Carpet is commonly laid on the floor to reduce the amount of noise transmitted to downstair rooms, but wood flooring is now employed instead of the carpet since carpet is likely to house such noxious insects as ticks or the like. When the wood flooring is employed, on the other hand, the particular flooring is still hard enough to propagate any slight impact sound as undesirable noise to the downstair rooms, and it is desirable that the flooring be provided with a shock absorbing and vibration controlling member.

For prior art usefully employable in making a vibration-controlling member, there may be enumerated U.S. Pat. No. 4,255,482 granted Mar. 10, 1981 to N. Udagawa, U.S. Pat. No. 4,415,616 granted Nov. 15, 1983 to A. Angioletti, and so on. Udagawa discloses a three layered vibration-absorbing flooring comprising a layer of granular baked clay filling between two synthetic resin layers of a fire-resisting resin but with fine air gaps retained between respective granules. It may be possible to form a wood flooring having the vibration-absorbing property by providing on or in place of upper one of the synthetic resin layers a wooden layer. Since the granular clay layer is, however, freely variable in the volume, it has been necessary to enclose the entire structure within a covering of a metallic sheet or the like, so that material costs would be increased while rendering manufacturing steps to be complicated, and still the resultant flooring has been poor in the workability. In Angioletti, on the other hand, there is shown a flooring in which a layer of heat insulating shavings of elastomer or wood dispersed in plastic matrix is formed between a top layer of tiles of ceramic, plastic or the like material and a textile backing layer. In this case, too, the top tile layer may be made of wood so as to form a wood flooring which is provided with shock resisting and absorbing property due to an elasticity of the plastic layer in which the elastomer or wood shavings are dispersed. In attaining a high vibration absorbing or controlling property, it is preferable and effective to elevate the loss factor in impact receiving layer by rendering the grain boundary friction interposed. In the case of the plastic layer of Angioletti, however, the grain boundary friction has been unable to attain and there has been a problem unsolved in providing the impact receiving layer showing a highly reliable vibration control.

2. Technical Field

A primary object of the present invention is, therefore, to provide a vibration-controlling member which is sufficiently elevated in the vibration-controlling action by rendering the grain boundary friction interposed, while allowing the member to be easily manufactured at a lower cost and to be excellent in the workability and usage.

According to the present invention, this object can be attained by rendering the vibration-controlling member of a top surface element and a shock-absorbing and vibration-controlling means disposed against one surface of the top surface element such that the shock-absorbing and vibration-controlling means comprises a powdery substance having the shock-absorbing and vibration-controlling action and contained in a retainer adhered to the one surface of the top surface element.

Other objects and advantages of the present invention shall be made clear in following description of the invention detailed with reference to preferred embodiments shown in accompanying drawings.

While the present invention shall now be detailed with reference to the respective embodiments shown, it should be appreciated that the intention is not to limit the present invention only to the particular embodiments shown, but to rather include all alterations, modifications and equivalent arrangements possible within the scope of appended claims.

DISCLOSURE OF PREFERRED EMBODIMENTS

Figure 1:
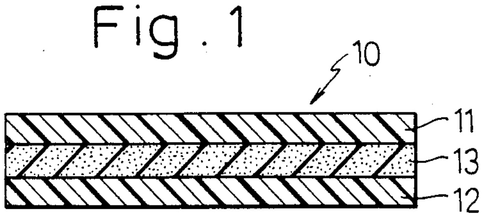
FIG. 1 is a schematic sectioned view in an embodiment of the sound-proof, shock-absorbing and vibration-controlling member according to the present invention.

According to one aspect of the present invention, a foamed body preferably in a sheet shape and having a powdery substance mixed therein is employed as the shock absorbing means of the vibration-controlling member. Referring to FIG. 1, a vibration-controlling member 10 according to the present invention comprises top surface and bottom plates 11 and 12 and a foamed body sheet 13 forming the shock absorbing means disposed between the both plates and adhered to them. The foamed body sheet 13 is preferably formed by a polymeric material and includes internally a flake-shaped powdery substance which is high in the aspect ratio (flake diameter/thickness) and shows a vibration controlling property due to a grain boundary friction. Mica is desirable to be used as the flaky powdery substance since mica is excellent in the cleavage and higher in the aspect ratio. Mica in particular of a grain size of 0.1 to 5 mm, in contrast to ordinary filler which is less than 0.1 mm, can be more advantageously employed because of a higher aspect ratio which can improve the vibration controlling property.

In the present instance, the top surface plate 11 is formed by a wooden material or such a polymeric material as a synthetic resin or the like, having a sheet made high in wooden appearance and adhered to the top face, and is made about 1 to 15 mm thick. The bottom plate 12 is also formed by a wooden, synthetic resin or the like material, to have a thickness of about 1 to 15 mm, while the foamed body sheet 13 has a foaming rate of several times and is about 0.5 to 10 mm thick. As the flake-shaped powder, in addition to mica there may be enumerated such material as pyrophillite, talc, chlorite, montmorillonite, kaoline, serpentine, halloysite, vermiculite and the like. For the grain size of the powdery substance, it is preferable to employ the one having a flake diameter of less than several mm in the primary grain size, for example, 0.1 to 5 mm for mica.

Considering the shock-absorbing or vibration-controlling action of the member 10, the maximum impact force Fmax applied to the member may be represented by a formula $$Fmax=\{\pi MV(1+\mu)\}/2t \quad (1)$$

wherein M is the mass of a body giving the impact to the member 10, V is colliding speed of the impact body, $\mu$ is the restitution coefficient, and t is an impact time which is represented by a following formula (2):

$$t=2.1M^{1/3}R^{-1/2}V^{-1/3}ko^{-1/3} \quad (2)$$

wherein R is a radius of curvature of contacting surface of the impact body, ko is a spring constant of the member 10 for a unit area.

In the foamed body sheet 13 of the vibration-controlling member 10 according to the present invention, the spring constant ko in the above formula (2) is made smaller by means of the entropy elasticity because the sheet 13 is of a polymeric material, and of the elasticity of air in the respective foam and, as the spring constant ko becomes smaller, the impact time t is prolonged so that the maximum impact force Fmax will be eventually decreased.

Figure 2:
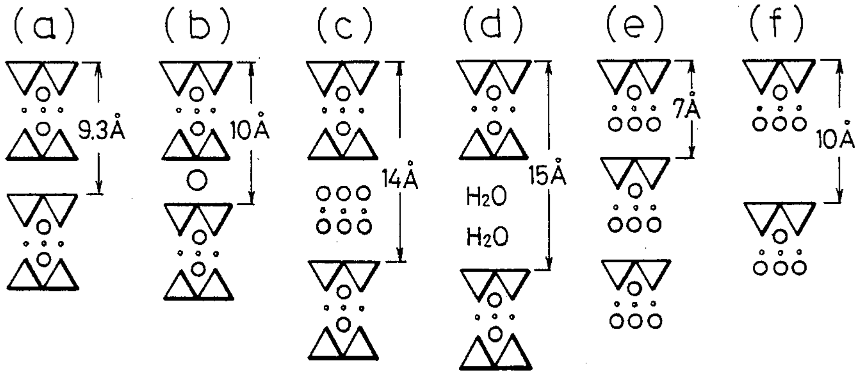
FIG. 2 shows in typically represented diagrams respective structures of various flaky powdery substances employed in the member of FIG. 1.

The restitution coefficient $\mu$ is represented by a following formula (3):

$$\mu=exp(-\pi\eta/2) \quad (3)$$

wherein $\eta$ is a loss factor of the member 10. When such pyrophillite or talc as shown in FIG. 2(*a*), such a mica as in FIG. 2(*b*), such chlorite as in FIG. 2(*c*), such montmorillonite as in FIG. 2(*d*), such kaoline or serpentine as in FIG. 2(*e*) or such halloysite as in FIG. 2(*f*) as the flaky particles mixed in the foamed body sheet 13, the particles are of a large aspect ratio and a large grain boundary friction will be generated between the respective particles upon being vibrated. By this action a vibration energy will be decreased and the loss factor $\eta$ of the member 10 will be made higher, as will be clear in view of the above formula (3), the restitution coefficient $\mu$ will be made smaller, and the maximum impact force Fmax is caused to be decreased.

As the polymeric material forming the foamed body sheet, practically, styrene-butadiene rubber (SBR), a mixture of natural rubber with SBR, natural rubber, chloroprene rubber, polyethylene, vinyl chloride, urethane, polybutadiene rubber, silicone rubber, acrylonitrile-butadiene rubber and the like may be employed, and the foaming rate for such material will be more practically about 1.1 to 10 times. Preferably, to be more concretely, SBR, the mixture of natural rubber with SBR or urethane will be foamed about 2 to 4 times, polyethylene or vinyl chloride will be about 2 to 10 times. While the foaming rate is not limited to such range, an insufficiently small foaming rate causes the shock-absorbing and vibration-controlling action likely to be insufficient, and an excessively large foaming rate renders the rigidity too low. The composition ratio of the powdery substance and polymeric material for the foamed body sheet 13 will be selected to be at about 1:0.1 to 20, at weight ratio. More desirably, their ratio should be 1:0.1 to 1. That is, the more amount of the powdery substance, the more effectively the grain boundary friction can be utilized. It is optimum, further, that the polymeric material is employed in an amount only enough for binding the powder particles so that the grain boundary friction of the powdery substance can be most effectively utilized. In that case, the polymeric material prepared by an emulsion of polyurethane, vinyl acetate or the like allows a larger amount of the powdery substance to be mixed therewith, and is desirable.

EXAMPLE 1

A wooden sheet 3 mm thick and another wooden sheet 9 mm thick were employed as the top plate 11 and bottom plate 12, respectively, while the foamed body sheet 13 was prepared with a foamed urethane sheet (urethane foam) at the foaming ratio of 3 times to be 3 mm thick, with phlogopite of about 1400 μm in the flake diameter admixed into the urethane resin at weight ratio of 1:3. The top and bottom plates 11 and 12 with the foamed sheet 13 interposed between them were stacked and joined into the vibration-controlling member 10.

Figure 3:
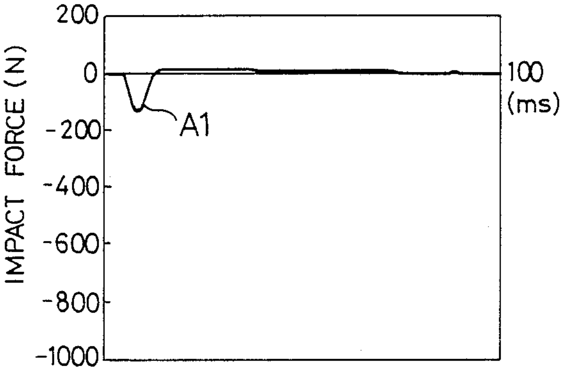
FIGS. 3 and 4 are diagrams showing respectively a varying time of impact force as applied to the member of FIG. 1.
Figure 4:
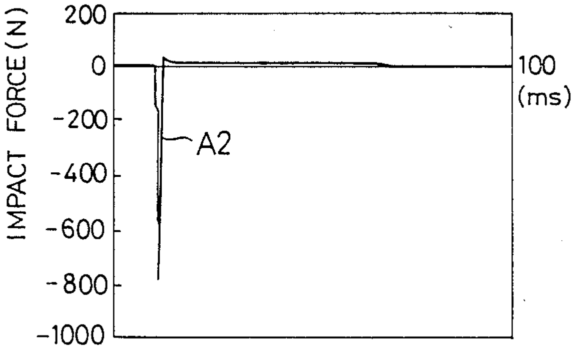
Figure 5:
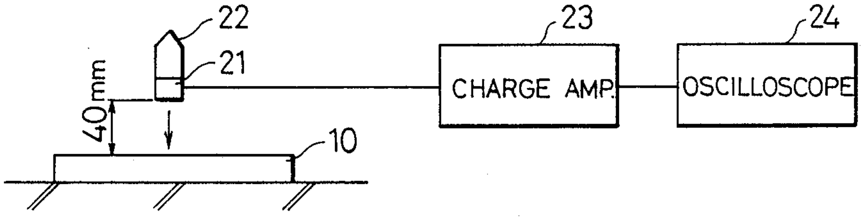
FIG. 5 is an explanatory view for a manner in which the impact force is measured.

Measured impact wave form upon application of an impact force to this member 10 is shown by a curve A1 in FIG. 3, whereas a shock wave form upon application of a similar impact to ordinary plywood 12 mm thick is shown by a curve A2 in FIG. 4. As would be clear when the curves were compared, the member 10 according to the present invention has rendered the maximum impact force substantially to be 1/5, and it has been thus found that the member 10 has shown an excellent shock absorbing action. In the diagrams of FIGS. 3 and 4, the ordinate represents the impact force (N) and the abscissa represents the time lapsed (ms). In measuring the impact force, a force transducer 21 was attached to a hammer 22 to be 500g, they were subjected to free fall from a level of 40 mm high down to the member 10, as shown in FIG. 5, the impact wave form upon which was obtained through a charge amplifier 23 at an oscilloscope 24. The impact force was made positive on the upper side with respect to the member 10.

EXAMPLE 2

A member 10 was obtained in the same manner as in EXAMPLE 1, except that SBR was employed instead of urethane resin of the foamed body sheet 13, and this member 10 has also achieved substantially the same shock-absorbing action as that of the member according to EXAMPLE 1.

EXAMPLE 3

A member 10 was obtained in the same manner as in EXAMPLE 1, except that a sheet of SBR and natural rubber mixed at a weight ratio of 1:1 was employed instead of urethane resin of the foamed body sheet 13, and this member 10 has achieved likewise the same shock-absorbing action as that of the member according to EXAMPLE 1.

EXAMPLE 4

A member 10 was obtained in the same manner as in EXAMPLE 1, except for the thickness of the foamed body sheet 13 made 6 mm. This member 10 has shown the maximum impact force of 97N. When the member was obtained in the same manner as in EXAMPLE 1, except for exclusion of phlogopite and the thickness of 6 mm, the maximum impact force was 115N. It has been thus found that the presence or absence of phlogopite results in a remarkable difference in the maximum impact force.

Figure 6:
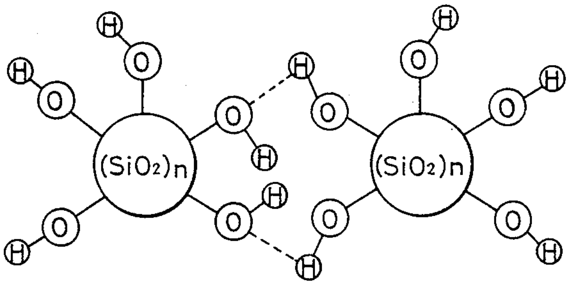
FIG. 6 shows in a typical representation a structure of silicic acid powder employed in another embodiment of the present invention.

According to another feature of the present invention, silicic acid powder is employed as the powdery substance mixed in the shock-absorbing means of the vibration-controlling member. This powder of silicic acid $[(SiO_2)_n]$ contains such OH base of slight coupling as shown by dotted lines in FIG. 6, whereby air gaps are present between the respective particles of the powdery substance, showing a sort of flock state, and the member has gaps thus present between the powder particles with the elasticity, which prolong the impact time. Between the respective particles of the silicic acid powder, there arises an energy loss due to the grain boundary friction, the loss factor $\eta$ in the entire foamed body sheet is increased, and the maximum impact force Fmax is caused to be reduced. For the grain size of the silicic acid powder, it is preferable that one of 7 to 25 nm in the primary grain size is employed. For the composition ratio of silicic acid with respect to the polymeric material, it should be up to about 1:10 since it is impossible to employ a larger amount in contrast to mica group and the like. Other arrangement and operation of the present feature are the same as those in the foregoing EXAMPLES.

EXAMPLE 5

A plywood of 3 mm thick was employed as the top plate 11, a plywood of 9 mm thick was employed as the bottom plate 12, and a foamed urethane sheet with silicic acid powder admixed and foamed at foaming rate of 3.5 times to be 3 mm thick was used for the foamed body sheet. The silicic acid powder was of a primary grain size of 16 nm and a composition ratio with respect to the urethane resin was made to be 1:10 at weight ratio. The top plate 11, foamed body sheet 13 and bottom plate 12 were stacked and bonded together to obtain a vibration-controlling member 10.

The impact wave form upon application of the impact to this member 10 has been proved to be almost the same as the curve A1 in FIG. 3 and thus has shown that the maximum impact force was improved to be an extent of about 1/5 of that in the case of FIG. 4 employing only the plywood.

EXAMPLE 6

A member 10 was obtained in the same manner as in EXAMPLE 5, except for a use of SBR instead of the urethane resin for the foamed body sheet 13. This member 10 has also proved that the shock-absorbing action similar to that in EXAMPLE 5 was obtained.

EXAMPLE 7

A member 10 was obtained in the same manner as in EXAMPLE 5, except for a use of a sheet of SBR and natural rubber at mixing ratio of 1:1 at weight ratio in place of the urethane resin as the foamed body sheet 13. This member 10 has also achieved the shock-absorbing action similar to that in EXAMPLE 5.

EXAMPLE 8

A member 10 was obtained in the same manner as in EXAMPLE 5, except that the thickness of the foamed body sheet 13 was made 6 mm. The maximum impact force of this member 10 was 101N. In view that the maximum impact force obtainable through the same manner as in EXAMPLE 1 except for the exclusion of phlogopite from the foamed body sheet and its thickness made 6 mm was 115N as has been measured in EXAMPLE 4, a remarkable difference in the maximum impact force was clearly shown by the presence or absence of the silicic acid powder.

Figure 7:
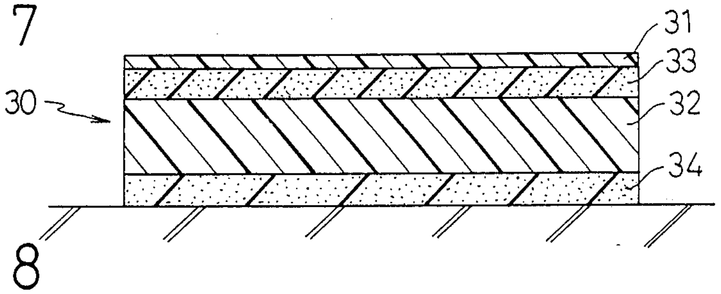
FIG. 7 shows in a schematic section another embodiment of the present invention.

According to still another feature of the present invention, the vibration-controlling member is formed to be utilizable specifically as a sound-proof flooring, and as directly adhered to floor surface of concrete slab and the like. Referring to FIG. 7, a member 30 comprises a top plate 31, bottom plate 32 and foamed body sheet 33 which correspond to the top and bottom plates 11 and 12 and foamed body sheet 13 in the embodiment of FIG. 1, and an elastic plate 34 is further joined to a surface of the bottom plate 32 opposite to the foamed body sheet 33. The powdery substance admixed in the foamed body sheet 33 in this case may be either the flake-shaped powder or the silicic acid powder. For the elastic plate 34, it is preferable that a foamed body of such polymeric material as a rubber, synthetic resin or the like having a viscoelastic property and, for example, of a size of 1 to 15 mm thick is employed.

EXAMPLE 9

A 3 mm thick plywood was employed as the top plate 31, a 9 mm thick plywood was used as the bottom plate 32, and a 7 mm thick foamed urethane sheet of a foaming rate of 3 times and containing phlogopite of an average flake diameter of 1,400 μm and admixed with urethane resin at a weight ratio of 1:3 was used as the foamed body sheet 33. For the elastic plate 34, a foamed natural rubber body of 5 mm thick was employed. These top and bottom plates 31 and 32, foamed body sheet 33 and elastic plate 34 were stacked and joined together to obtain the vibration-controlling member 30.

Figure 8:
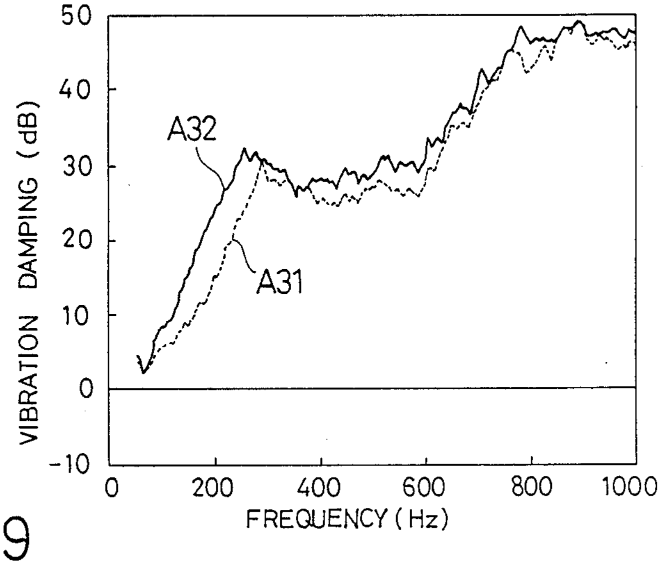
FIG. 8 is a diagram showing the vibration damping of the member shown in FIG. 7.
Figure 9:
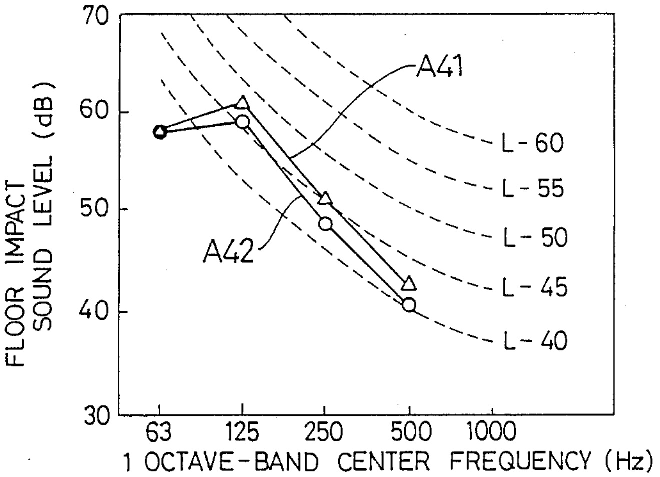
FIG. 9 is a diagram showing floor impact sound level of the member of FIG. 7.

Vibration damping property of thus obtained member 30 is as shown by a curve A32 in FIG. 8, in which another dotted line curve A31 represents the same property of a member obtained in the same manner as in EXAMPLE 9 except for exclusion of phlogopite from the foamed body sheet 33. As would be clear when the both curves were compared with each other, the member 30 according to the present invention has been remarkably improved in the vibration damping property. When floor impact sound level was measured in accordance with Japanese Industrial Standard (JIS) A-1418, the member 30 of EXAMPLE 9 has shown such level as represented by a curve A42 in FIG. 9 which was of a high sound insulation to be at a level of L-46. Comparing with another curve A41 in FIG. 9 which was denoting the sound insulation of the member obtained in the same manner as in EXAMPLE 9 except for exclusion of phlogopite from the member 33, it has been found that the member 30 according to the present invention is superior than that of the curve A41 which has been only at level L-48.

EXAMPLE 10

A member 30 was obtained in the same manner as in EXAMPLE 9 except for a use of SBR in place of the urethane resin for the foamed body sheet 33, and substantially the same functions as in EXAMPLE 9 has been achieved by this member 30.

EXAMPLE 11

A member 30 was obtained in the same manner as in EXAMPLE 9 except for a use of SBR and natural rubber mixed at a weight ratio of 1:1 instead of the urethane resin, and this member 30 has been also successful in achieving substantially the same functions as in EXAMPLE 9.

EXAMPLE 12

A 3 mm thick plywood and a 9 mm thick plywood were employed as the top and bottom plates 31 and 32, respectively, and a 6 mm thick foamed urethane sheet of the foaming rate of 3 times and with the silicic acid powder admixed was used as the foamed body sheet 33, the silicic acid powder having been of a primary grain size of 16 nm and mixed with the urethane resin at a weight ratio of 1:10. For the elastic plate 34, a 5 mm thick natural foamed rubber sheet was employed. These top and bottom plates 31 and 32, foamed body sheet 33 and elastic plate 34 were stacked and joined into a vibration-controlling member 30.

Figure 10:
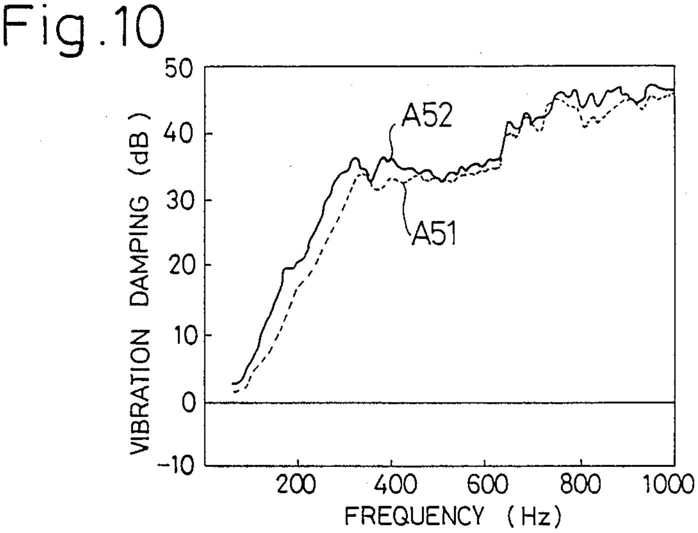
FIG. 10 is a diagram showing the vibration damping of the member in still another embodiment of the present invention.
Figure 11:
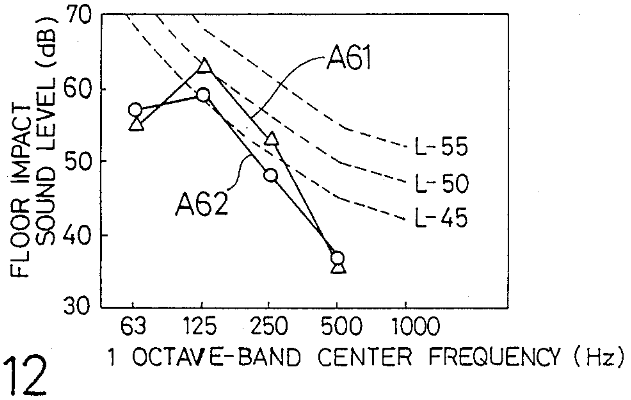
FIG. 11 is a diagram showing the floor impact sound level for the member according to the same embodiment as in FIG. 10.

The vibration damping property of this member 30 was as represented by a curve A52 in FIG. 10, in which another dotted line curve A51 showing the property of a member obtained in the same manner as in EXAMPLE 12 except for exclusion of the silicic acid from the foamed body sheet 33, and a comparison between the both curves has proved that the member 30 according to the present invention has been remarkably improved in the vibration damping. Measurement of the floor impact sound level in accordance with JIS A-1419 standard has resulted in such level as represented by a curve A62 in FIG. 11, showing that such high sound insulation as to be at a level L-46, and, comparing with another curve A61 showing the sound insulation of a member obtained in the same manner as in EXAMPLE 12 except for exclusion of the silicic acid powder from the foamed body sheet 33, it has been also found that the member 30 of the present invention was excellent in the sound insulation in view of that of the curve A61 reaching only a level L-50.

EXAMPLE 13

A member 30 was obtained in the same manner as in EXAMPLE 12 except that SBR was employed in place of the urethane resin as the foamed body sheet 33, and this member 30 has attained substantially the same function as that in EXAMPLE 12.

EXAMPLE 14

A member 30 was obtained in the same manner as in EXAMPLE 12 except that a mixture of SBR and natural rubber at weight ratio of 1:1 was used as the foamed body sheet 33, instead of the urethane resin, and this member 30 has also attained substantially the same function as that in EXAMPLE 12.

In the vibration-controlling member according to the present invention, further, there should be included such a member comprising only the top plate and foamed body sheet, as that of the member 10 of FIG. 1 embodiment from which the bottom plate 12 is omitted, or of the member 30 of FIG. 7 embodiment from which the bottom and elastic plates 32 and 34 are omitted. In this case, the top plate and foamed body sheet may be of the same ones as in FIG. 1 or 7 embodiment, and the member is to be formed for the direct adhesion to floor surface of concrete slab and the like.

EXAMPLE 15

Except for omission of the bottom and elastic plates 32 and 34 from the member 30 of EXAMPLE 9, a vibration-controlling member was obtained in the same manner as in EXAMPLE 9, and this member has shown substantially the same level of sound insulation attained as in the case of EXAMPLE 9.

EXAMPLE 16

A vibration-controlling member 30 was obtained in the same manner as in EXAMPLE 12 except for the omission of the bottom and elastic plates 32 and 34 from the member of the foregoing EXAMPLE 12, and this member has shown the same level of the shock absorption and sound insulation as those in EXAMPLE 12.

Figure 12:
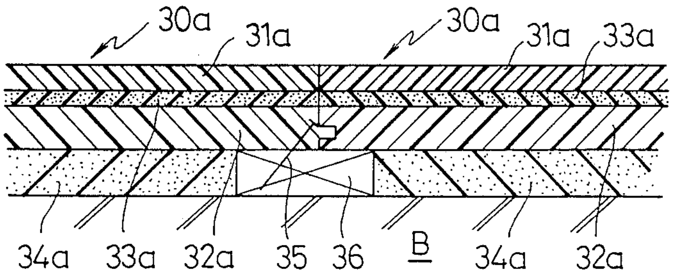
FIG. 12 is an explanatory view in a section for a working example of the member according to the present invention.

The vibration-controlling member according to the present invention can be provided, more practically, onto flooring surface of concrete slab B and the like as shown in FIG. 12, along common joists 36 fitted onto the slab. That is, one of the members 30a in which, for example, a foamed body sheet 33a is interposed between top and bottom plates 31a and 32a is secured to the common joist 36 by means of nails 35, while the whole bottom face of the elastic plate 34a is bonded to the surface of the concrete slab B and the like by means of any optimum adhesive agent. Further member 30a of next stage is assembled with the bottom plate 32a of the previously secured member 30a along the common joist 36, the elastic plate 34a of the further member 30a is similarly fixed to the surface of the concrete slab B and the like by the adhesive agent, and thus a plurality of the members 30a are sequentially secured to the flooring surface by repeating these steps, while it is of course possible to provide the members 30a onto the concrete slab surface without employing any common joist nor nail.

Figure 13:
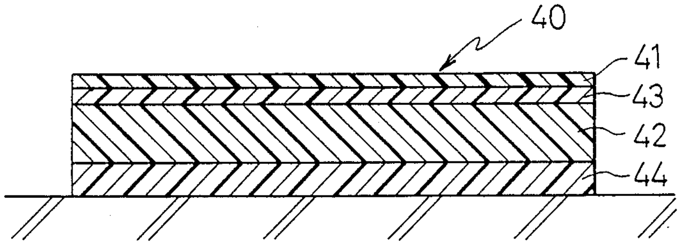
FIG. 13 shows in a schematic view a further embodiment of the present invention.

According to a still further feature of the present invention, a vibration-controlling member comprises a powder layer employed as the shock absorbing means, the powder layer being formed by covering powder particles with an oil. Referring to FIG. 13, the member 40 thus formed can be employed as, for example, a sound-proof flooring in a manner similar to the foregoing embodiment. In the present instance, the member 40 comprises a powder layer 43 arranged between a top plate 41 and a bottom plate 42 and forming the shock absorbing means, and an elastic plate 44 bonded to the bottom plate 42 to be opposite to the layer 43. For the top, bottom and elastic plates 44, 42 and 44, materials similar to those in the foregoing embodiment may be employed in the similar thickness dimension. Preferably, the powder layer 43 is disposed between the top and bottom plates 41 and 42, and is formed by filling a frame body (not shown) of such a material high in the elasticity as a rubber material and the like with a mixture of an oil and powdery substance.

The powder layer 43 is normally made to be of a thickness of 0.5 to 10 mm, and the oil and powdery substance forming the powder layer 43 may be mixed in a weight ratio in a range of, for example, 1:1 to 4 while this can be properly altered depending on the type of the oil or powder employed. It is preferable to employ a drying oil as linseed oil, tung oil, perilla oil and the like, as well as sesame oil, olive oil, rape seed oil, cottonseed oil, tsubaki oil, soybean oil and the like, while an oil high in viscosity is also preferably employed. For the powdery substance, the flake-shaped powder employed in the foamed body sheet 13 in the member 10 shown in FIG. 1 may be similarly employed, while the silicic acid powder or such ones as shirasu baloon, glass powder, alumina powder and the like may be employed. These powdery substances may be of a diameter of such one as has been referred to with reference to, for example, FIG. 1, so that any impact applied to the member 40 will cause the energy loss to occur due to the large grain boundary friction generated between the respective powder particles of the powder layer 43, the loss factor $\eta$ will be thereby made large in the entirety of the member 40 while the restitution coefficient $\mu$ becomes smaller as will be clear from the formula (3), and the maximum impact force Fmax is reduced.

EXAMPLE 17

A 3 mm thick plywood and a 9 mm thick plywood were employed for the top and bottom plates 41 and 42, respectively, and a mixture of silicic acid powder of primary grain size of 10 nm and linseed oil at a weight ratio of 1:2 and made 2 mm thick was used as the powder layer 43. As the elastic plate 44, a foamed natural rubber body of a thickness of 5 mm was employed. The respective top and bottom plates 41 and 42, powder layer 43 and elastic plate 44 were stacked and bonded together to obtain a vibration control member 40.

Figure 14:
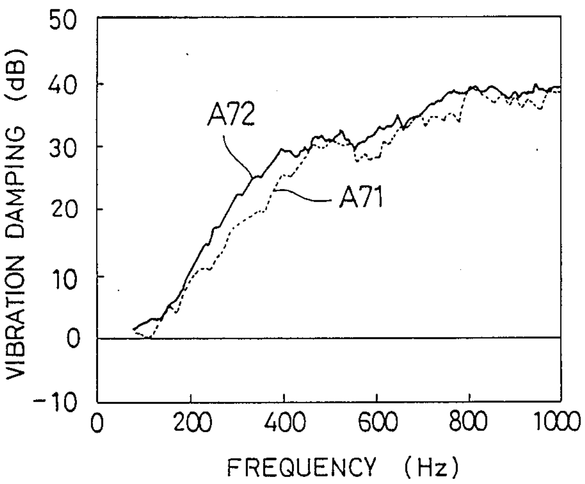
FIGS. 14 to 16 are diagrams respectively showing the vibration damping of the member of FIG. 13.

The vibration damping property of this member 40 is shown by a curve A72 in FIG. 14, in which another curve A71 is of the same property for a member obtained in the same manner as in EXAMPLE 17 except for exclusion of the linseed oil from the powder layer. As would be clear from a comparison of the both curves, it has been found that the vibration damping has been improved to a large extent at frequency range of 200 to 500 Hz. It would be here appreciated that the silicic acid powder employed involves concavo-convex surface of the powder particles which is effective to hold the oil admixed, and thereby the moldability of the powder and oil is desirably improved.

EXAMPLE 18

Except for a mixing at a weight ratio of 1:4 of the silicic acid powder and linseed oil in the powder layer 43, a member 40 was obtained in the same manner as in EXAMPLE 17.

Figure 15:
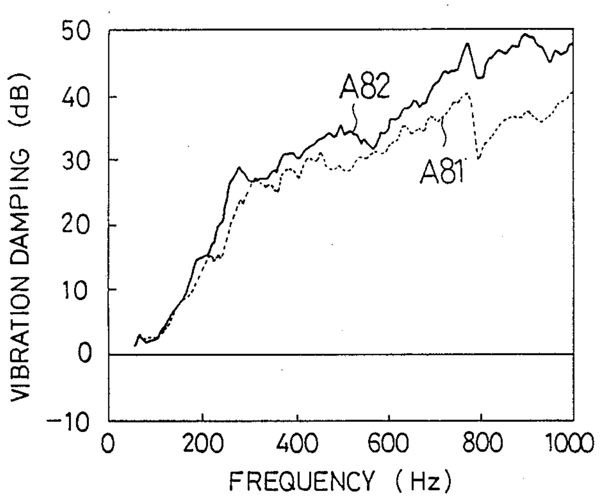

The vibration damping property of this member 40 is as represented by a curve A82 in FIG. 15 and, as will be clear when this curve A82 is compared with another curve A81 showing the same property of a member obtained in the same manner as in EXAMPLE 18 except for omission of any oil from the powder layer 43, the member 40 of the present invention has proved that the member is excellent in the vibration damping over a lower frequency range to a higher frequency range. Further, it has been also revealed that the member according to the present embodiment is rich in the moldability of the powder layer in contrast to the foregoing EXAMPLE 17.

EXAMPLE 19

A member 40 was obtained in the same manner as in EXAMPLE 17 except for a replacement of the silicic acid powder by a glass powder which was of a grain size of 1 mm.

Figure 16:
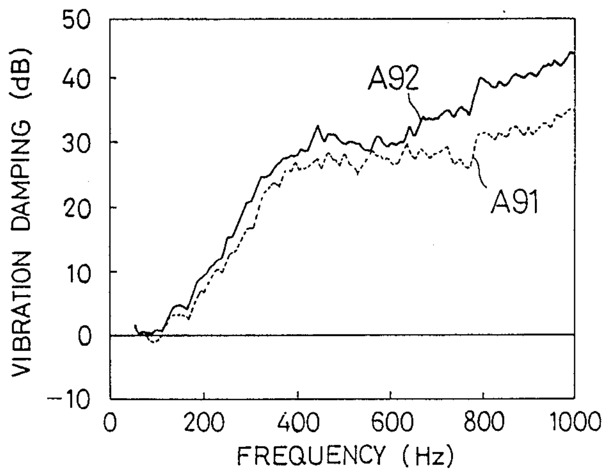

The vibration damping property of this member 40 is as represented by a curve A92 in FIG. 16. Another curve A91 in FIG. 16 shows the same property of a member obtained in the same manner as in EXAMPLE 19 except for omission of an oil from the powder layer. A remarkably excellent vibration damping property has been attained from the low frequency range through the use of oil to a high frequency range. It has been also proved that, in contrast to EXAMPLES 17 and 18, the member 40 of the present instance has greater rigidity and thus has an excellent adaptability to be a flooring.

According to yet another feature of the present invention, the powder layer 43 is provided as a foamed body sheet which includes a powdery substance mixed with an oil. In the present instance, the foamed body sheet comprises a foamed body of such polymeric material as synthetic resin, rubber or the like, which is normally made about 0.5 to 10 mm thick. Composition ratio of the powder mixed with oil with respect to the polymeric material forming the foamed body sheet will be varied depending on the type of power and oil. When the flaky powder is employed, the ratio will be, for example, 1:0.1 to 20 when the silicic acid powder is used, the ratio will be about 1:10 to be lower than that employing the flaky powder. The polymeric material for the foamed body sheet and its foaming rate may be those which have been referred to in the FIG. 1 embodiment with reference to the foamed body sheet 13.

EXAMPLE 20

Figure 17:
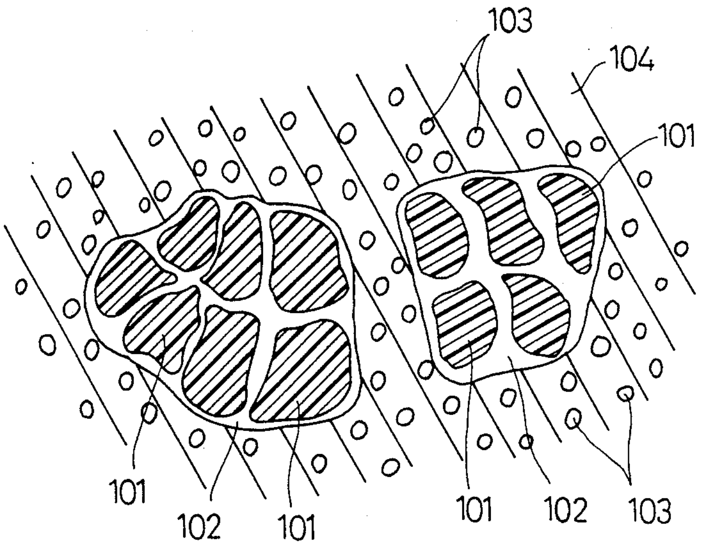
FIG. 17 is an explanatory view showing in a typical representation of an internal structure of a foamed sheet member employed in a working aspect according to the present invention.
Figure 17A:
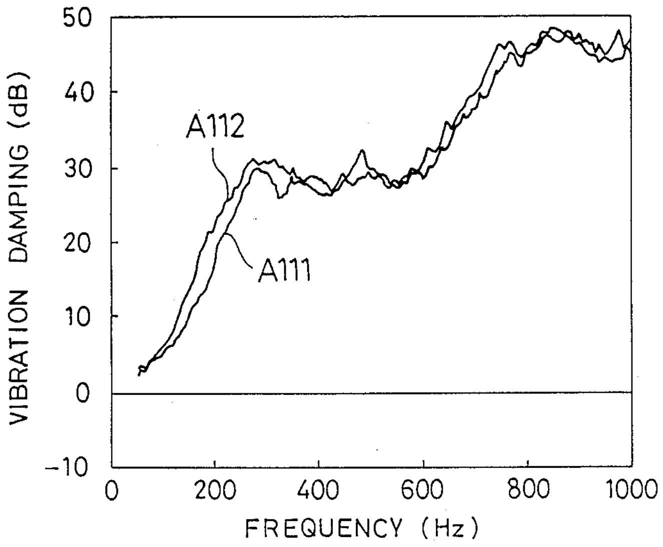
FIG. 17*a* is a diagram showing the vibration damping of the member employing the foamed sheet member of FIG. 17.

A powder layer 43 of a 2 mm thick foamed body sheet was formed on a rear surface of the top plate 41 of 3 mm thick plywood. The sheet was of urethane foamed at a foaming rate of 3 times, while mica mixed with linseed oil was inserted in the sheet. Mica carrying the linseed oil was mixed with the synthetic resin at a weight ratio of 1:3, and a vibration-controlling member 40 was obtained. In the powder layer 43, as shown in FIG. 17, a plural mica particles 101 are mutually combined through linseed oil 102 into blocks which are included in the foamed body sheet 104 having many air foams 103, whereby an effective grain boundary friction is caused to occur so as to increase the loss factor $\eta$ and attain excellent vibration damping property and vibration controllability. The vibration damping of this member 40 was as shown by a curve A112 in FIG. 17*a* in which another curve A111 denoting the vibration damping of a member obtained substantially in the same manner as in EXAMPLE 20 except that the powder layer contained no oil. A comparison of the both curves would reveal that the member according to the present invention has been excellent in such low frequency range to 100 to 300 Hz.

EXAMPLE 21

Another member 40 was obtained in the same manner as in EXAMPLE 20, except for a use of silicic acid powder in place of mica.

This member has also exhibited an excellent vibration damping property similar to that of EXAMPLE 20.

EXAMPLE 22

Another member 40 was obtained in the same manner as in EXAMPLE 20 except for a use of a foamed SBR sheet in place of polyurethane.

This member has also proved that an excellent vibration damping property similar to that of EXAMPLE 20 was attained.

EXAMPLE 23

Figure 18:
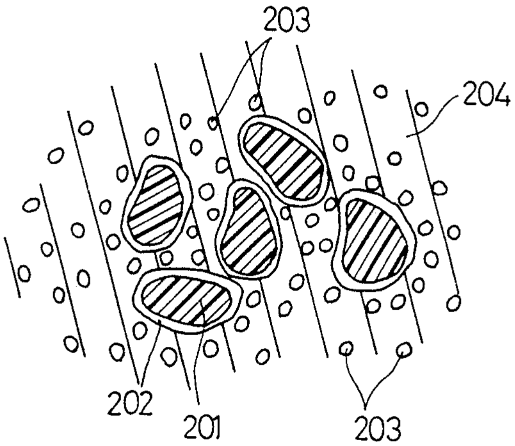
FIG. 18 is an explanatory view showing in a typical representation an internal structure of a foamed sheet member employed in another working aspect of the present invention.

Another member 40 was obtained in the same manner as in EXAMPLE 20 except for that the mixing ratio of the silicic acid powder with linseed oil was varied so that powder particles 201 respectively made independent of each other by a coating of linseed oil 202, as shown in FIG. 18, would be present in foamed body sheet 204 having many air foams 203.

This member has also exhibited excellent vibration damping property and vibration controllability similar to those in EXAMPLE 20.

EXAMPLE 24

A 3 mm thick plywood was employed for both of the top and bottom plates 41 and 42, and a powder layer 43 was provided on rear surface of the top plate 41 by a 2 mm thick foamed sheet of urethane at a foaming rate of 3 times with mica and covering linseed oil admixed in the sheet. Mica covered by the linseed oil was mixed with the resin at a weight ratio of 1:3. The top and bottom plates 41 and 42 and powder layer 43 were stacked and joined together to obtain a vibration-controlling member 40.

This member 40 has also proved that the excellent vibration damping property and vibration controllability similar to EXAMPLE 20 were attained.

According to a still further feature of the present invention, the powder layer 43 is formed by enclosing a mixture of powder and oil in a sheet material preferably of a bag shape. For the powder and oil, such ones as has been referred to can be employed, and vinyl chloride, polyethylene, polyester, polypropylene, various rubbers and the like may be employed preferably as the sheet material, while it is possible to use cloth, paper and the like.

EXAMPLE 25

A top plate 41 of 3 mm thick plywood was backed as adhered with a powder layer 43 of silicic acid powder covered with linseed oil and enclosed in a vinyl chloride sheet, and a vibration-controlling member 40 was thereby obtained. The powder and oil were mixed at a weight ratio of 1:1.

This member 40 has shown a loss factor $\eta$ of 0.077 and, in view of the loss factor $\eta$ of 0.053 for a member in which the powder was not covered by any oil, has proved that excellent vibration damping property and vibration controllability were attained.

EXAMPLE 26

Another member 40 was obtained in the same manner as in EXAMPLE 25 except that the mixing weight ratio of silicic acid powder and linseed oil was made 1:2.

The loss factor $\eta$ of this member was of a further improved value of 0.264, showing thus excellent vibration damping property and vibration controllability attained.

EXAMPLE 27

Another member 40 was obtained in the same manner as in EXAMPLE 25 except for a change in the mixing ratio of silicic acid powder and linseed oil to 1:4.

This member has shown a further improved loss factor $\eta$ of 0.425, much higher vibration damping property and vibration controllability.

EXAMPLE 28

Still another member 40 was obtained in the same manner as in EXAMPLE 25 except that the powder layer was formed by enclosing a mixture of phlogopite of a flake diameter 1400 $\mu$m and linseed oil in a vinyl chloride sheet.

The loss factor $\eta$ of this member has reached such a high value of 0.457.

We claim:

1. A vibration-controlling member comprising:

a top surface element, and a shock-absorbing and vibration-damping means backing said top surface element, said shock-absorbing and vibration-damping means including a flake-shaped powdery substance having a high flake diameter to thickness ratio providing shock-absorbing and vibration-damping action due to a grain boundary friction of the flake-shaped powdery substance and a retainer of a foamed body sheet of a polymeric material for enclosing therein said powdery substance and adhered to an inner surface of said top surface element, said foamed body sheet being formed of a water dispersion of an emulsion of said polymeric material, and said powdery substance and polymeric material being mixed at a weight ratio of 1:0.1 to 1.

2. A member according to claim 1 wherein said flake-shaped powdery substance is of mica.

3. A member according to claim 2 wherein said mica is of a grain size of 0.1 to 5.0 mm.

4. A member according to claim 1 which further comprises a bottom plate disposed to oppose said top surface element and to hold said shock-absorbing and vibration-damping means between said bottom plate and said top surface element.

* * * * *